J. WATTS.
AEROPLANE.
APPLICATION FILED JULY 10, 1912.
1,153,659.
Patented Sept. 14, 1915.
6 SHEETS—SHEET 3.
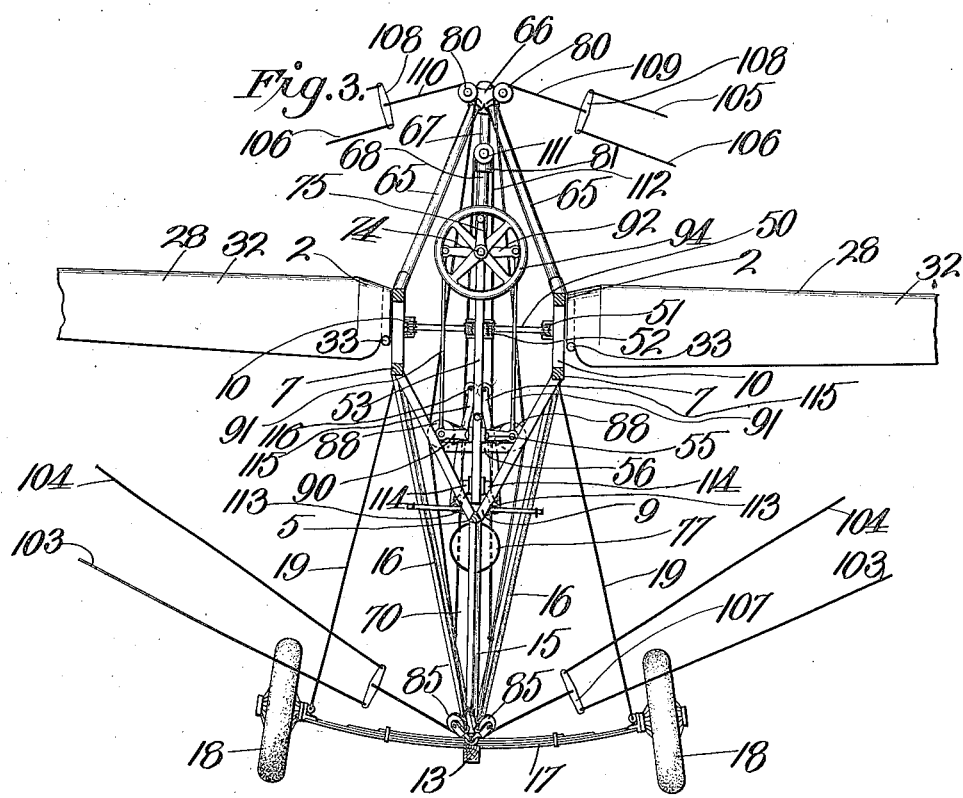
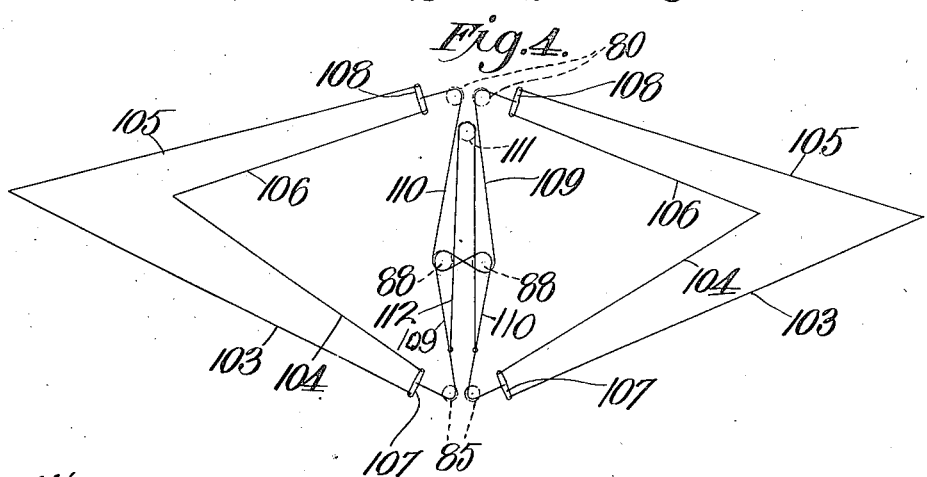
Witnesses
Frank R Glow
M. A. Preston
Inventor
John Watts
By George Y. Thorpe Atty.

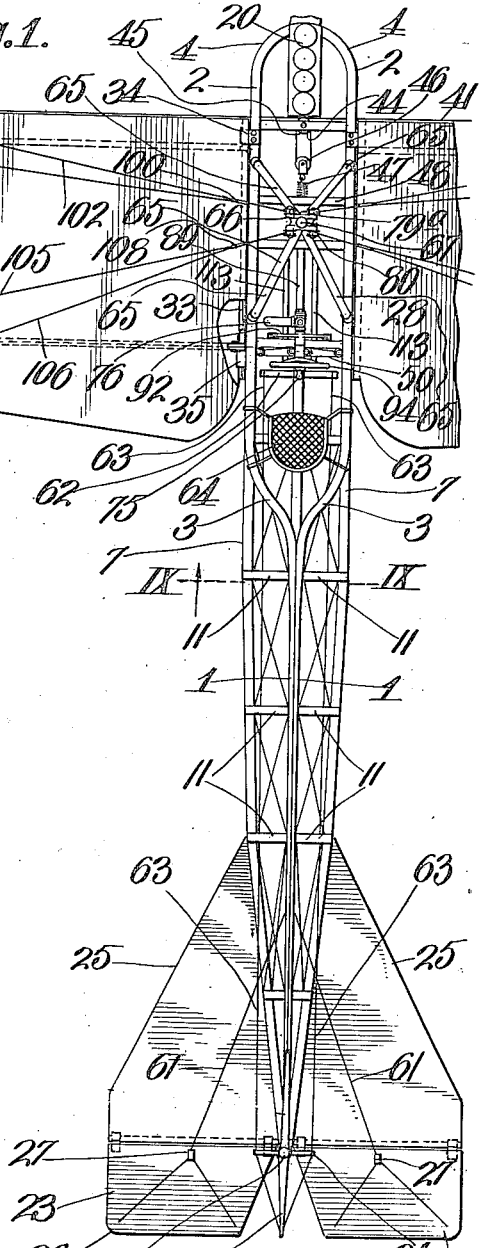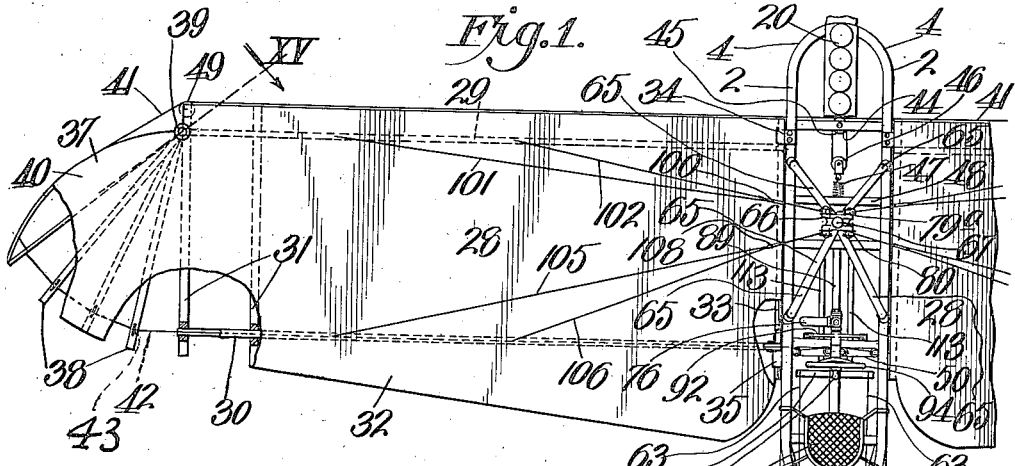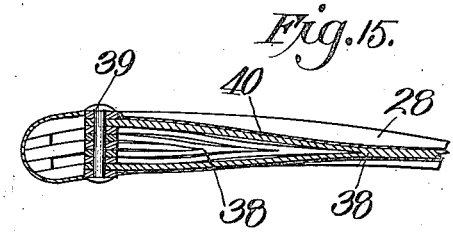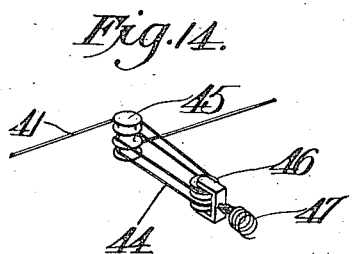

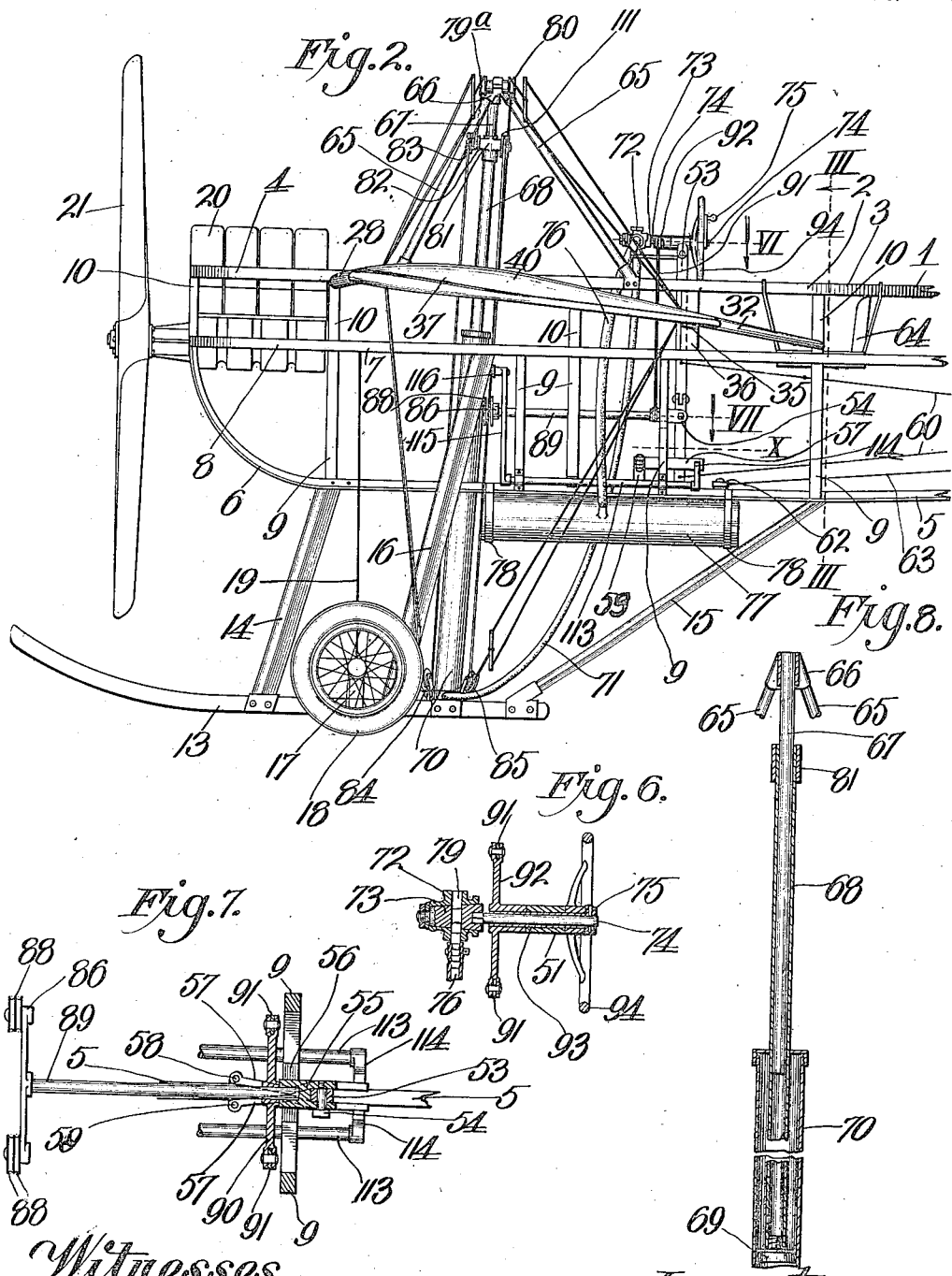

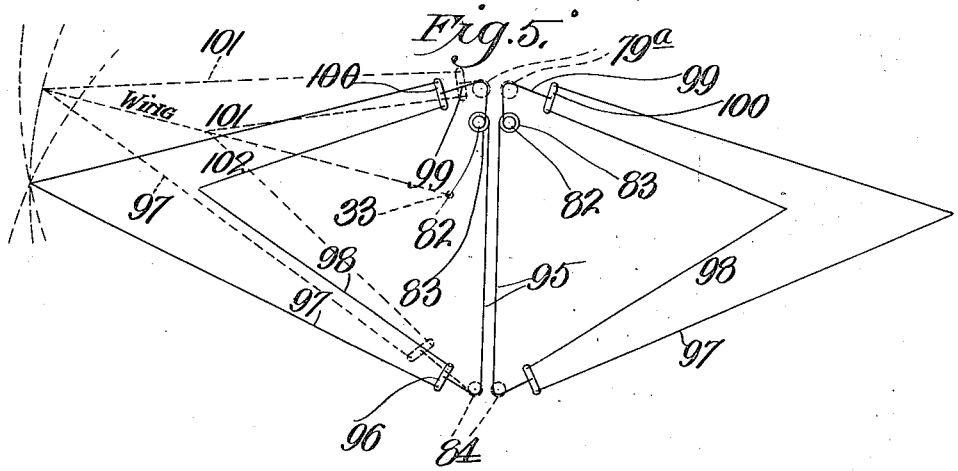
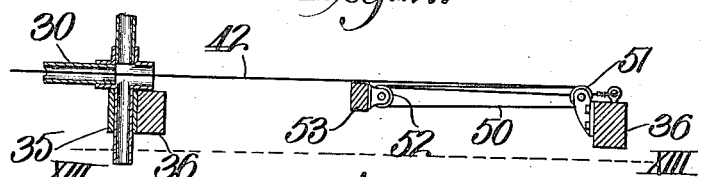
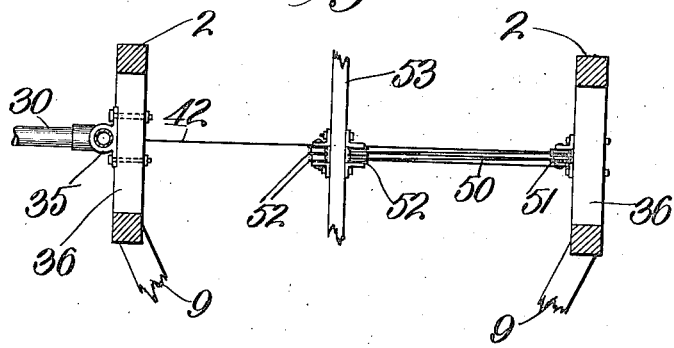

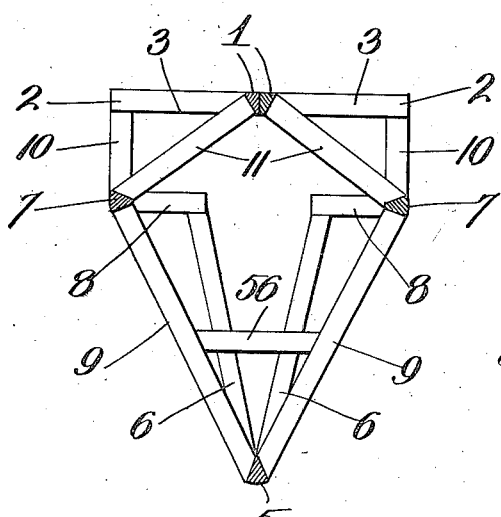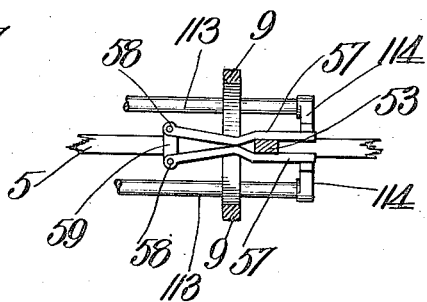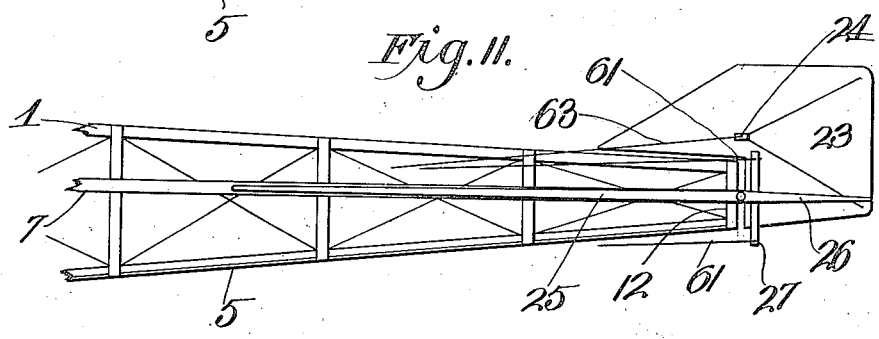

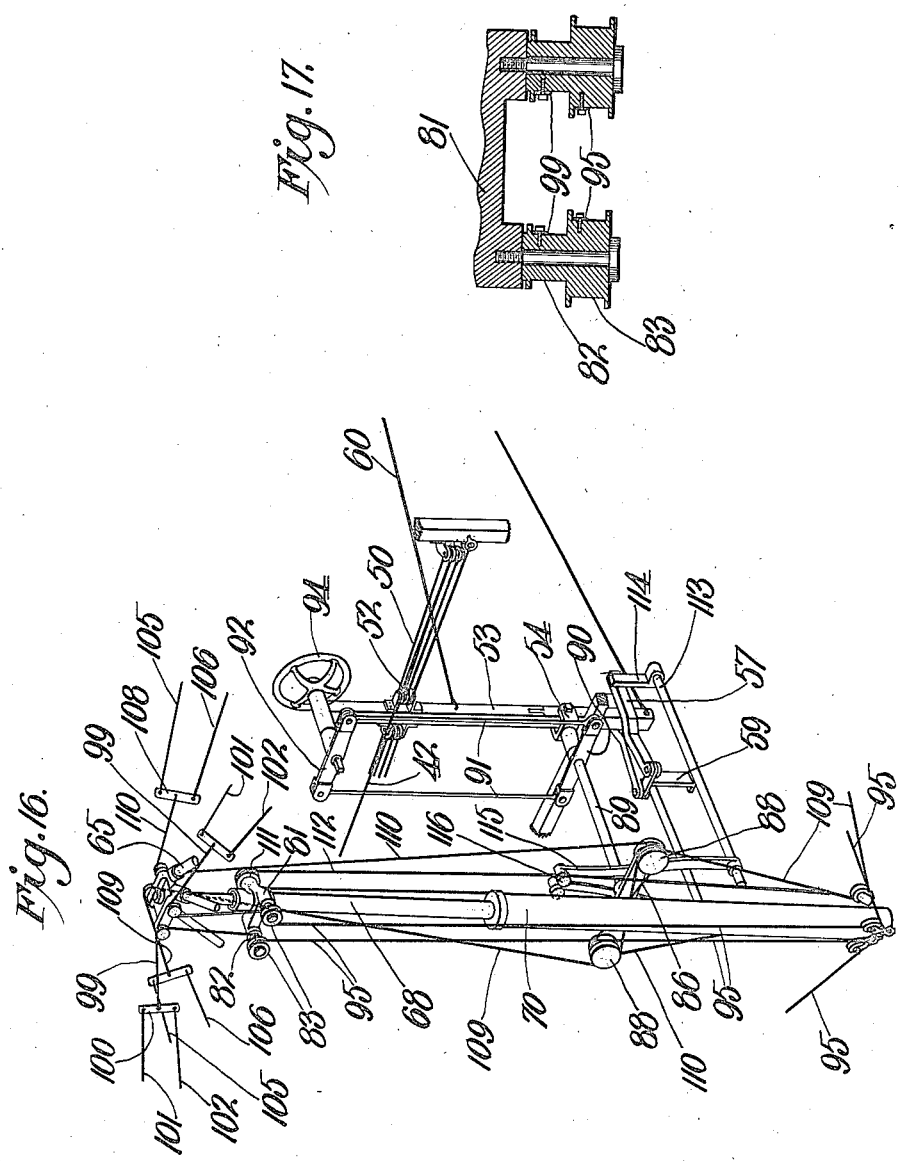

UNITED STATES PATENT OFFICE.

JOHN WATTS, OF KANSAS CITY, MISSOURI.

AEROPLANE.

1,153,659.          Specification of Letters Patent.          Patented Sept. 14, 1915.

Application filed July 10, 1912. Serial No. 708,549.

*To all whom it may concern:*

Be it known that I, JOHN WATTS, a citizen of the United States, residing at Kansas City, in the county of Jackson and State of Missouri, have invented certain new and useful Improvements in Aeroplanes, of which the following is a specification.

This invention relates to aeroplanes, and has for its object to produce a machine having hinged wing planes and means whereby they may be swung to and held in a substantially horizontal position or to and held at different dihedral angles while in flight.

A further object is to produce a control column movable in one direction to simultaneously effect a change of the wings and the raising of the horizontal rudder and in the reverse direction to effect the restoration of said parts to normal position.

Another object is to minimize "bucking" of the machine by holding the wings in flight position under a yielding pressure so that they shall largely relieve the machine as a whole of the sudden shock or jar invariably met with during flight in windy or gusty weather and thereby minimize danger of dislodgment of the operator from his seat.

Another object is to produce a machine having wings provided at their outer ends with foldable tips and means whereby the operator is enabled to collapse either of the tips for the purpose of restoring the equilibrium of the machine.

With these objects in view, the invention consists in certain novel and peculiar features of construction and organization as hereinafter described and claimed; and in order that it may be fully understood reference is to be had to the accompanying drawings, in which:—

Figure 1, is a broken plan view of a monoplane embodying my invention. Fig. 2, is a side view of the front end of the machine, on a larger scale than Fig. 1. Fig. 3, is a vertical section on the line III—III of Fig. 2, with the seat omitted. Fig. 4, is a diagrammatic view of the rear portion of the wing control connections as viewed from the rear thereof. Fig. 5, is a similar view of the front portion of the wing control connections. Fig. 6, is a section on the dotted line VI of Fig. 2. Fig. 7, is a section on the dotted line VII of Fig. 2. Fig. 8, is a vertical section of the connection between an air cylinder and piston thereof and a guide for the piston in its reciprocatory action. Fig. 9, is a cross section of the fuselage of the machine on the line IX—IX of Fig. 1. Fig. 10, is a section on the dotted line X of Fig. 2. Fig. 11, is a side view of the rear end of the fuselage, the stabilizing planes and the vertical and horizontal rudder. Fig. 12, is a fragmentary horizontal section showing the means for collapsing one of the wing tips. Fig. 13, is a vertical section on the line XIII—XIII of Fig. 12. Fig. 14, is a detail perspective view showing the means for holding the wing tips yieldingly spread or expanded. Fig. 15, is a section on the line XV of Fig. 1. Fig. 16 is a diagrammatic perspective view of the connections leading from the control column. Fig. 17, is a cross section through the compensating pulleys hereinafter referred to.

Referring first to the construction of the fuselage, a pair of bars consists of portions 1 fitting flatly together and portions 2 spaced apart, the adjacent ends of portions 1 and 2 being connected together by curved portions 3, and the front ends of portions 2 by inwardly-bowed portions 4. Centrally below portions 1 is a bar 5, which terminates short of the front or bowed ends of portions 2, and secured to the front end of bar 5 is a pair of bowed upwardly-diverging bars 6, which terminate in a horizontal plane below the bowed portions 4 of portions 2. Vertically below portions 2, in the horizontal plane of the upper ends of curved bars 6, is a pair of horizontal bars 7 which, at their front ends, bow inward at 8 and are secured in any suitable manner to the upper ends of bars 6. Bars 7, from a point rearward of curved portions 3, converge rearwardly to a point in the vertical plane of the rear ends of portions 1, and said bars 7 are connected rigidly to bar 5 by a series of downwardly converging struts 9, and to portions 2 by vertical struts 10, and to portions 1 by upwardly converging struts 11. The rear ends of bars 1 are fastened to a short vertical bar 12, and the rear end of bar 5 is fastened to the lower end of said bar 12, the intermediate rearward-converging bars 7 being also fastened at their rear extremities to said bar 12, the various parts described coöperating with suitable wire bracing shown in Figs. 1 and 11, to produce a light, strong and rigid fuselage.

Underlying bar 5 and projecting beyond the front end of the fuselage is a skid 13, upturned at its front end, and connecting said skid with bar 5 is a pair of braces 14 and 15, the skid being braced against lateral movement by a pair of downwardly-converging braces 16, secured at their upper ends to bars 7, and secured to and extending transversely of the skid, is a resilient axle 17, preferably of the leaf-spring type, and journaled on the ends of said axle is a pair of wheels 18, the ends of the axle being also connected by wires 19 to the bars 7 of the fuselage.

20 is a motor of any suitable or preferred type, supported in the front end of the fuselage, and 21 is the propeller to be driven by the motor. At the rear end of the fuselage is a suitaably-journaled rudder post 22, and mounted thereon is the rudder 23 whereby the machine is steered to the right or left, and projecting toward opposite sides from the rudder post are arms 24, whereby the adjustment of the rudder is effected by suitable connections hereinafter referred to.

25 is a pair of horizontal stabilizing planes rigid with and disposed at opposite sides of the fuselage, and hinged thereto is a horizontal rudder 26, and projecting upward and downward from said rudder 26 are braced arms 27, which through connections hereinafter described, are utilized to raise or lower the rudder 26 to aid in effecting upward and downward movement respectively, of the machine.

28 indicates the wings, each consisting of a front spar 29 and rear tubular spar 30, connected by a plurality of fore and aft ribs 31 and a fabric cover 32. At their inner ends and paralleling the ribs, the wings are equipped with tubes 33 pivotally engaging brackets 34 (Fig. 1), secured to portions 2 of the fuselage, and supports 35; the latter being shown as brackets secured to struts 36 of the fuselage, (Fig. 2), it being noted that the said hinge connections between the inner ends of the wings and the fuselage are inclined upward slightly, to the horizontal. At the outer ends of the wings and carried thereby are foldable wing-tips 37, the same consisting of a series of forked ribs 38 arranged in fan-like relation and pivoted together at their front ends at 39 at or near the front outer corners of the wings, and a flexible cover 40, the forked ribs guarding against upward flexing of the tips while spread in flight. To effect the unfolding or folding of wing tips, cables 41 and 42 are secured to the outermost ribs 38, the cables 42 preferably extending through eyes or guides 43 of the remaining ribs and through the rear or tubular spars 30 of the wings.

The cable 41, centrally between its extremities where it is attached to the outermost ribs of the foldable tips, is formed with a plurality of loops 44 arranged around a series of fixed superposed sheaves 45 and a corresponding number of movable sheaves 46, the latter being held retracted normally by a coiled spring 47 attached to a cross bar 48 bridging portions 2 of the fuselage. These loops 44 and sheaves 45 and 46 constitute a block and tackle mechanism whereby a short movement of sheaves 46 toward sheaves 45, permits of the folding of either of the wing tips and a corresponding reverse movement of said sheaves 46 results in the unfolding of the folded tips, it being noted by reference to Fig. 1, that the outer portions of the cable 41 extend around guide sheaves 49 at the outer front corners of the wings, and that said spring when unresisted, holds said tips in unfolded or normal position.

The cables 42 extend from the inner ends of the tubular spars 30, across the fuselage, and each is formed with a plurality of loops 50, and is attached at its inner end to the support or strut 36 at the side of the fuselage most remote from the connected wing tip. The outer portions of the loops engage superposed sheaves 51 attached to the adjacent strut 36 and the inner ends of said loops engage superposed sheaves 52 carried by an upright control column 53, it being understood that the two sets of sheaves 51 and 52 constitute block and tackle mechanisms whereby to impart to or accommodate relatively long movements of the wing tips through lateral swinging movement of the control column, it being also understood that the operation of one tip does not affect the other as the cable 41 "pays out" or "takes up" to accommodate the collapse or unfolding of either tip.

The control column is composed of an upper and a lower section pivoted together to permit the former which carries sheaves 52, to swing laterally. And near the upper end of the lower section, the column is pivoted at 54 to swing longitudinally, being pivoted to a bracket 55 mounted on a cross-bar 56 connecting and supported by a pair of the struts 9. The lower end of the column fits into a wedge clamp, consisting of a pair of plates 57 bowed toward each other and pivoted at 58 for movement in a horizontal plane, to a T-shaped post 59 mounted upon the bar 5. The function of this clamp is hereinafter explained.

By imparting longitudinal swinging movement to the column, the horizontal rudders are raised or lowered through suitably-guided cables 60 attached to their front ends to the column above and below its pivotal point 54, and at their rear ends to branched cables 61 connected to the arms 27, hereinbefore described. These cables will preferably be crossed so that rearward movement of the upper end of the column will raise the horizontal rudders and reverse movement will lower the same, the lower end of the column at the same time, through the wedge clamp and other connections hereinafter described, effecting a change in the angle of incidence of the wings or permitting them to return to normal condition. To operate the vertical rudder, a foot lever 62 is pivoted about midway its length on the bar 5, and is connected at its ends by cables 63 to the opposite ends of the rudder arms 24, and for convenience in operating this foot lever and the control column, a seat 64 is suspended from the said portions 2 in a plane slightly rearward of said foot lever. Erected upon the portions 2 of the fuselage is a pyramidal frame, consisting of four upwardly-converging bars 65, rigidly connected at their upper ends by a coupling 66, and extending downward from and rigid with the coupling is a guide rod 67.

68 is a tubular piston rod, fitting slidingly on rod 67, projecting upwardly from a piston 69 fitting slidingly in a cylinder 70, rigidly secured upon the skid 13, and communicating with the lower end of the cylinder is a pipe 71, which communicates at its upper end with a three-way valve 72, the plug 73 of the valve being secured upon a shaft 74 journaled in the upper end or head of the control column 53, and to turn said shaft for the purpose of opening or closing said valve, a crank handle 75 is secured on the rear end of the shaft. When the valve is opened by operation of the crank handle, it establishes communication between pipe 71 and a pipe 76, leading from a compressed air tank 77 suspended by stirrups 78 from bar 5, the arrangement being such that when said valve is opened air passes from the compressed air tank into the lower end of the cylinder and forces the piston upwardly for a purpose which hereinafter appears, reverse movement of the crank beyond its initial position establishing communication between the cylinder and the atmosphere by way of pipe 71 and the third port 79, of the valve casing, as shown in Fig. 6. Journaled on the coupling 66 forward and rearward, respectively, of the piston are two pairs of grooved pulleys or sheaves 79ᵃ and 80, and secured upon the stem of the piston is a bracket 81, upon which is journaled forward of the stem a pair of compensating pulleys each consisting of a small member 82 and a large member 83 fixed together. Secured forward and rearward respectively, and at the lower end of the cylinder 70, are two pairs of pulleys or sheaves 84 and 85, and secured upon opposite ends of a rock bar 86, are sets of pulleys or sheaves 88; said rock bar being disposed at the rear side of the cylinder and secured upon the front end of a horizontal rock shaft 89 journaled at its rear end in bearing 55 mounted upon cross bar 56 as shown clearly in Fig. 7. Shaft 89 is also equipped with a rock-bar 90 connected by vertical rods 91 to a rock bar 92 secured rigidly on a sleeve 93 journaled on shaft 74, and carrying a hand wheel 94.

95 is a pair of cables secured at their upper ends to the large members 83 of the compensating pulleys, and extending around the pulleys or sheaves 84, and attached to the lower ends of said cables 95 are equalizing levers 96, and attached at their lower ends to the opposite ends of said equalizing levers are cables 97 and 98, attached at their upper ends to the front spars of the wings 28, the cables 97 being connected to said spars near their outer ends, and the cables 98 at points nearer the fuselage.

99 are cables which engage and extend downward and outward from sheaves 79ᵃ, and are attached at their lower ends to the small members 82 of the compensating pulleys and at their outer ends to equalizing levers 100, and attached at their inner or upper ends to opposite ends of said levers are cables 101 and 102, which cables are attached at their outer ends to the front spars of the wings coincidentally with the points of attachment of cables 97 and 98 respectively. It will thus be seen that the cables above and below the wings converge outwardly and that the cables of each set bear a diverging relation.

Attached to the rear spars of the wings at different distances from the fuselage are lower sets of cables 103 and 104, and coincidentally attached at their outer ends to said spars, are upper sets of cables 105 and 106, said sets of cables 103—104 and 105—106 converging outwardly. The inner ends of cables 103 and 104 are attached to opposite ends of equalizing levers 107, and the inner ends of cables 105—106 are attached to opposite ends of equalizing levers 108, and attached at its opposite ends to the lower left-hand equalizing lever 107, and the upper right-hand equalizing lever 108, is a cable 109; said cable extending over the left-hand sheave 88 and under the right-hand sheave 88 of the same set, over the right-hand sheave 80, and under the left-hand sheave 85. A similar cable 110 connects the upper left-hand equalizing lever 108 to the lower right-hand equalizing lever 107, and extends over the right-hand sheave 88, under the left-hand sheave 88 of the other set, over the left-hand sheave 80, and under the right-hand sheave 85. The use of the terms "left-hand" and "right-hand" in the preceding portion of this paragraph, is with respect to Figs. 3 and 4, of the drawings. It will thus be seen that swinging the sheaves 88 in one direction about the axis of shaft 89 results in the "taking up" of one of the cables and in the "paying out" of the other cable, and that reverse movement of said sheaves 88 gives the opposite effect, it being understood from this that the "taking up" of a cable results in an upward pull through cables 105 and 106 on one of the wings and in a downward pull on the opposite wing through cables 103 and 104 attached thereto, and that the "paying out" of the other cable permits the first-named wing to be moved upward and the other wing to be moved downward. It will also be understood that this adjustment of the wings is accomplished by rotating the hand-wheel 94 in one direction or the other, power being transmitted for such operation from the hand-wheel to the sheaves 88, through the medium of sleeve 93, rock-bar 92, rods 91, rock-bar 90, shaft 89, and rock-bar 86 carrying the said sheaves 88.

Journaled on bracket 81 carried by the piston stem, is a pulley or sheave 111, and extending over the same is a doubled cable 112, attached at its lower ends to the cables 109 and 110, as shown most clearly in Fig. 4, the arrangement being such that upward movement of the piston shall exert a pull on cable 112 and cables 109 and 110, and thus effect a downward pull through cables 103 and 104 on the wings, this downward movement of the wings being effected by operating the crank handle 75 so as to open communication by means of the valve and pipes 71 and 76, between the air tank and the cylinder. When the operation of the crank handle is reversed, the valve closes communication between the cylinder and the air tank. Sufficient reverse movement of the crank handle opens communication between the cylinder and the atmosphere. As this occurs the upward pressure on the wings—assuming the machine is in flight—forces the same upward and the piston downward, the movement of the wings keeping the cables taut, it being of course, understood that the sheaves will be provided with customary and well known guards (not shown) for retaining the cables in place. Owing to the fact that the cables above the plane extend at a less angle to the wings than the cables below the plane, it is necessary that the lower front cables shall "pay out" more than the front upper cables "take up" because the front portions of the wings must not flex. On the other hand, it is desirable that the rear portions of the wings shall flex upward when the wings are permitted to swing upward by exhausting air from the cylinder, this upward flexing being caused through the use of the non-compensating rear cables.

In Fig. 5, dotted lines are employed showing a wing swung upward, the central arcuate line showing the movement of the wing at the point of attachment of cables 101 and 97, and the outer and inner arcuate lines the paths which said point would tend to follow if no provision was made for "paying out" cable 97 and "taking up" cable 100, it being also noted that the "pay out" movement must and does exceed the "take up" movement.

113 is a pair of longitudinal shafts journaled on the lower ends of certain struts 9, and provided at their rear ends with inwardly and upwardly projecting crank-arms 114 engaging opposite sides of the plates 57 forming the wedge clamp hereinbefore mentioned, and said shafts 113 are provided at their front ends with long crank arms 115 equipped with grooved rollers 116 arranged within the loop of the doubled cable 112, the arrangement being such that the spreading of the wedge clamp by operation of the control column operates shafts 113 and thereby bows the two ends of the doubled cable 112 outwardly by means of pulleys 116, and as a result imparts an upward pull on the lower portions of cables 109 and 110 whereby the rear portions of the wings are warped downward for the purpose of changing their angle of incidence to the line of flight.

The described action of the control column exerts a forward pull on the lower cable 60 leading to the upper side of the horizontal rudder and correspondingly slackens the other cable 60 leading to the other side of the horizontal rudder, the column, of course, rocking at its pivotal point 54. Assuming the wings and rudders to be in the position shown, the motor is started and at the proper time the machine is released. After traveling on the ground a sufficient distance it gains headway and rises, the ascent being made more abrupt and rapid if the operator pulls the control column rearward, to raise the horizontal rudder and increase the angle of incidence of the wings. After attaining the plane of flight desired, the control column is restored to normal position to lower the rudder and permit the wings to straighten out from their warped condition, under the pressure of the sustaining air, it being understood that while in flight and without regard to the position of the horizontal rudder or the condition of the wings, the machine may be steered to the right or left by proper operation of the vertical rudder effected by manipulation of the foot lever 62. Assuming the machine tilts laterally it may be restored to proper position by reversing warping the wings by turning the hand-wheel in the proper direction, this action rocking the bar 86 and through sheaves 88 taking up the cable between two of the levers 107 and 108 and paying out the cable between the other pair of levers. If this reverse warping of the wings fails to instantly restore the equilibrium of the machine the upper part of the control column is swung laterally toward the high side of the machine and through the connected cable 42, effects the collapse of the wing tip at such side, the spring 47 yielding slightly to pay out cable 41 sufficiently to accommodate such collapsing action. It will thus be seen that provision is made to guard against dangerous lateral tilting of the machine, it being noted that the warping action will be most effective when the speed is greatest and that the collapsing of the tips will be most effective when the speed is comparatively low.

To shift the wings to a dihedral angle, the crank handle is turned to open the valve and exhaust a portion of the air from the cylinder, this resulting in the instantaneous upward movement of the wings and a downward movement of the piston and the sheave 111 and the compensating pulleys, the latter being turned by the pull of cables 95 on pulley members 83, the slackening cables 99 being simultaneously wound on the small members 82 of said pulleys. By turning the crank handle to establish communication between the tank and cylinder, air enters the latter and effects downward swinging of the wings, the cables 99 turning the compensation pulleys as they unwind therefrom and winding the slackening cables 95 thereon.

Under exceptional conditions it might be desirable to set the wings at a sharp dihedral angle, for instance, where headway is lost from motor trouble, as in this case the quick exhaust of the air from the cylinder would permit the wings to rise instantly with respect to the plane of support. At the same time the angle of incidence would be decreased because of the non-compensating action of the warping cables that is to say, the cables 105 and 106 would tend to warp both wings upward at their rear margins and thus effect a shifting of the plane of support further rearward thereof. The result of these actions would be to start the machine forward, i. e. give it headway and enable the operator to regain control or to glide to the ground. If flying low at the time the danger could be diminished by admitting air to the cylinder to restore the wings to proper sustaining position, and by increasing the angle of incidence of the wings and raising the horizontal rudder through a rearward pull on the control column.

From the above description it will be apparent that I have produced an aeroplane embodying the features of advantage enumerated as desirable in the statement of the object of the invention and which may be changed in minor particulars without departing from the spirit and scope of the invention as defined in the appended claims.

I claim:

1. In an aeroplane, a fuselage, a wing projecting laterally from each side of said fuselage, and cables for operating said wings and connected to the front and rear edges thereof from above and from below, each of the front cables being attached at its opposite ends to the same wing and each of the rear cables being attached at its opposite ends to different wings.

2. In an aeroplane, a fuselage, a wing projecting from each side of the fuselage, a plurality of cables connected to said wings from above and from below and suitably guided upon the fuselage, the lower portions of the cables extending at greater angles to the wings than the upper portions, and means engaging said cables to shift the wings, said means including provision for taking up and paying out the lower portions faster than the upper portions of the cables.

3. In an aeroplane, a fuselage, a wing projecting laterally from the fuselage at each side thereof and capable of swinging in a vertical plane, suitably guided cables, each overlying one wing and underlying the other and connected at its opposite ends to different wings, and compressed-fluid-actuated means for exerting a downward pull on the said underlying ends of the cables.

4. In an aeroplane, a fuselage, a wing projecting laterally from the fuselage at each side thereof and capable of swinging in a vertical plane, suitably guided cables, each overlying one wing and underlying the other and connected at its opposite ends to different wings, and means for reversely warping the rear portions of said wings simultaneously.

5. In an aeroplane, a fuselage, a wing projecting laterally from the fuselage at each side thereof and capable of swinging in a vertical plane, suitably guided cables, each overlying one wing and underlying the other and connected at its opposite ends to different wings, and means for exerting a downward pull on the said underlying end of one of said cables and an upward pull on the opposite end of the same cable.

6. In an aeroplane, a fuselage, a wing projecting laterally from the fuselage at each side thereof and capable of swinging in a vertical plane, suitably guided cables, each overlying one wing and underlying the other and connected at its opposite ends to different wings, and means for changing the angle of incidence of the wings while the aeroplane is in flight by warping the rear portions of the wings downward simultaneously.

7. In an aeroplane, a fuselage, a wing projecting outwardly from and at each side of the fuselage and suitably-guided cables, each overlying one wing and underlying the other and attached at its ends to different wings, the said underlying ends of the cables extending at greater angles to the wings than the said overlying ends.

8. In an aeroplane, a fuselage, a wing projecting outwardly from and at each side of the fuselage, suitably-guided cables, each overlying one wing and underlying the other and attached at its ends to different wings, the said underlying ends of the cables extending at greater angles to the wings than the said overlying ends, a yieldingly-elevated device connected to said cables and exerting a downward pull therethrough on said wings and means for diminishing the force of such pull to permit said device to move downward and the wings to swing upward while the aeroplane is in flight.

9. In an aeroplane, a fuselage, a wing projecting outwardly from and at each side of the fuselage, suitably-guided cables, each overlying one wing and underlying the other and attached at its ends to different wings, the said underlying ends of the cables extending at greater angles to the wings than the said overlying ends, a yieldingly-elevated device connected to said cables and exerting a downward pull therethrough on said wings, means for diminishing the force of such pull to permit said device to move downward and the wings to swing upward while the aeroplane is in flight, and means to reverse the movement of said device to cause the said underlying ends of the cables to reverse the wing movement.

10. In an aeroplane, a fuselage, a wing projecting outwardly from and at each side of the fuselage, suitably-guided cables, each overlying one wing and underlying the other and attached at its ends to different wings, the said underlying ends of the cables extending at greater angles to the wings than the said overlying ends, means engaging said cables and movable to simultaneously "take up" one of them and thus pull upward on one of the wings and downward on the other and at the same time "pay out" the other cable to accommodate said movement of the wings.

11. In an aeroplane, a fuselage, a wing projecting laterally at each side of and hingedly connected to the fuselage, a pair of guide sheaves above and a pair of guide sheaves below the fuselage, a cable extending over one of the upper guide sheaves and below one of the lower guide sheaves, a second cable extending over the other upper guide sheave and under the other lower guide sheave, the opposite ends of each cable being connected to different wings, a rock lever intermediate the upper and lower sets of sheaves, and means whereby rocking movement of said lever in one direction shall "take up" one of said cables and "pay out" the other and rocking movement in the opposite direction shall "take up" the last-named cable and "pay out" the other cable.

12. In an aeroplane, a fuselage, a wing projecting laterally from each side of said fuselage, and cables for operating said wings and connected to the front and rear edges thereof from above and from below, each of the front cables being attached at its opposite ends to the same wing, and extending at a greater angle to the same from below than from above, said front cables being provided with differential winding means for taking up the lower portions thereof faster than the upper portions thereof.

13. In an aeroplane, a fuselage, a wing projecting laterally from each side of said fuselage, a rear horizontal rudder, cables for operating said wings and connected to the front and rear edges of the same from above and below, a doubled cable connected at its opposite ends to points on said rear cables, means for spreading said doubled cable for causing the rear cables to warp the wings, and a control column provided with connections for simultaneously operating said rudder and said spreading means.

14. In an aeroplane, a fuselage, a wing projecting laterally from the fuselage at each side thereof, and capable of flexing along its rear edge, suitably guided cables attached at their outer ends to the rear portion of the wings, a doubled cable suitably guided, a rocking bar, and means carried by the rocking bar, engaging the doubled cable, whereby the same may be caused to exert a downward pull simultaneously on the rear portions of the wings through the instrumentality of said first-named cables.

15. In an aeroplane, a fuselage, a wing projecting laterally from the fuselage at each side thereof, and capable of flexing along its rear edge, suitably guided cables attached at their outer ends to the rear portion of the wings, a doubled cable suitably guided, and movable means for applying pressure on said doubled cable at angles to its length to cause it to pull the rear portions of the wings downward through the instrumentality of the first-named cables.

16. In an aeroplane, a fuselage, a wing projecting laterally from the fuselage at each side thereof, and capable of flexing along its rear edge, suitably guided cables attached at their outer ends to the rear portion of the wings, a control column movably mounted on the fuselage, a rocking bar, and means carried by the rocking bar, actuated by movement of said column to warp the rear portions of said wings downward simultaneously through the instrumentality of the said cables.

17. In an aeroplane, a fuselage, a wing projecting laterally from the fuselage at each side thereof, and capable of flexing along its rear edge, suitably guided cables attached at their outer ends to the rear portion of the wings, a doubled cable suitably guided, a movable control column carried by the fuselage, and means whereby movement of said column shall, through said doubled cable and said first-named cables, simultaneously warp the rear portions of the wings downward.

18. In an aeroplane, a fuselage, a wing projecting laterally from the fuselage at each side thereof, and capable of flexing along its rear edge, suitably guided cables attached at their outer ends to the rear portion of the wings, a doubled cable suitably guided, a wedge clamp mounted on the fuselage and consisting of two members, a pivoted control column fitting in the wedge clamp and adapted when moved in one direction to force the members of the clamp apart, and means whereby such movement of the members shall effect the downward warping of the rear portions of the wings through the instrumentality of the doubled cable and said first-named cables.

19. In an aeroplane, a fuselage, a wing projecting laterally from the fuselage at each side thereof, and capable of flexing along its rear edge, suitably guided cables attached at their outer ends to the rear portion of the wings, a doubled cable suitably guided, a pair of rock-shafts, carried by the fuselage, provided with crank arms engaging the doubled cable at opposite sides of its guided point, a pivoted control column carried by the fuselage, and means whereby proper movement of the control column shall rock said shafts and cause the cranks thereof to warp the rear portions of the wings downward through the instrumentality of the doubled cable and said first-named cables.

20. In an aeroplane, a fuselage, a wing projecting from the fuselage at each side thereof, and capable of swinging vertically, suitably-guided cables, each overlying and attached to one wing and underlying and attached to the other wing, a rock-shaft, and means whereby turning movement of the said shaft in one direction shall exert a pull on opposite ends of one of said cables, and turning movement of said shaft in the opposite direction shall exert a pull on the opposite ends of the other cable.

21. In an aeroplane, a fuselage, a wing projecting from the fuselage at each side thereof, and capable of swinging vertically, suitably-guided cables, each overlying and attached to one wing and underlying and attached to the other wing, a rock-shaft, suitably guided means holding each of said cables bowed in opposite directions and crossed between their bowed portions, and means whereby turning movement of the rock-shaft in one direction shall cause the means holding the cables bowed to apply pressure on one of said cables and thereby exert an upward pull on one wing and a downward pull on the other and at the same time "pay out" the other cable to accommodate such movements of the wings.

22. In an aeroplane, a fuselage, a wing projecting from the fuselage at each side thereof, and capable of swinging vertically, suitably-guided cables, each overlying and attached to one wing and underlying and attached to the other wing, a rock-shaft, a suitably-journaled shaft having laterally projecting arms, a second shaft having laterally projecting arms, connections between the arms of said shafts for transmitting power from one to the other, a cross bar mounted on the said second shaft, and means carried by said cross bar and holding both of said cables bowed or doubled in opposite directions and crossed between said bowed portions.

23. In an aeroplane, a fuselage, a wing projecting laterally at each side of and from the fuselage and pivoted for vertical movement, a tank containing fluid under pressure, a cylinder connected with the tank, a piston in the cylinder, a valve, whereby fluid may be permitted to pass from the tank into the cylinder or from the latter to the atmosphere, and means whereby movement imparted to the piston by fluid entering the cylinder shall exert a downward pull on the wings, and whereby said wings shall be permitted to swing upward through the flow of fluid from the cylinder.

24. In an aeroplane, a fuselage, a wing projecting laterally at each side of and from the fuselage and pivoted for vertical movement, a tank containing fluid under pressure, a cylinder connected with the tank, a piston in the cylinder, a valve whereby fluid may be permitted to pass from the tank, into the cylinder or from the latter to the atmosphere, a pair of equalizing pulleys, movable with said piston, and each composed of a small and a large member, a cable engaging each small member of the equalizing pulleys and connected at its opposite end to one of said wings from a point higher than the hinged end of the same, a second pair of cables, each engaging one of the large members of the equalizing pulleys and connected at its opposite end to one of the wings and extending thereto from a point a greater distance below the hinged point than said first-named cables extend above the hinge point.

25. In an aeroplane, a fuselage, a wing projecting laterally at each side of and from the fuselage and pivoted for vertical movement, and capable of flexing along its rear margin, a pair of guides above the center of the fuselage, a pair of guides below the center of the fuselage and a greater distance below the plane of the wings than the first-named guides, a cable extending over one of the upper guides and under one of the lower guides and connected at its ends to the rear portions of different wings, a similar cable extending over the other upper guide and the other lower guide and connected at its ends to the rear portions of different wings, a second pair of upper guides, a second pair of lower guides, a pair of compensating pulleys between said second pairs of guides, each pulley comprising a small member and a large member, a pair of cables, extending over the second pair of upper guides and attached at their lower ends to the small members of the pulleys and connected at their opposite ends to the front portions of the wings, another pair of cables extending under the second lower pair of guides and attached at their upper ends to the large members of said pulleys and connected at their opposite ends to said wings, and means for holding the wings yieldingly depressed.

26. In an aeroplane, a fuselage, a wing projecting laterally at each side of and from the fuselage, and pivoted for vertical movement, and capable of flexing along its rear margin, a pair of guides above the center of the fuselage, a pair of guides below the center of the fuselage and a greater distance below the plane of the wings than the first-named guides, a cable extending over one of the upper guides and under one of the lower guides and connected at its ends to the rear portions of different wings, a similar cable extending over the other upper guide and the other lower guide and connected at its ends to the rear portions of different wings, a second pair of upper guides, a second pair of lower guides, a pair of compensating pulleys between said second pairs of guides, each pulley comprising a small member and a large member, a pair of cables, extending over the second pair of upper guides and attached at their lower ends to the small members of the pulleys and connected at their opposite ends to the front portions of the wings, another pair of cables extending under the second lower pair of guides and attached at their upper ends to the large members of said pulleys and connected at their opposite ends to said wings, and yielding means exerting a downward pull on said wings through the ends of the cables which underlie the wings.

27. In an aeroplane, a fuselage, a wing projecting laterally at each side of and from the fuselage and pivoted for vertical movement, and capable of flexing along its rear margin, a pair of guides above the center of the fuselage, a pair of guides below the center of the fuselage and a greater distance below the plane of the wings than the first-named guides, a cable extending over one of the upper guides and under one of the lower guides and connected at its ends to the rear portions of different wings, a similar cable extending over the other upper guide and the other lower guide and connected at its ends to the rear portions of different wings, a second pair of upper guides, a second pair of lower guides, a pair of compensating pulleys between said second pairs of guides, each pulley comprising a small member and a large member, a pair of cables, extending over the second pair of upper guides and attached at their lower ends to the small members of the pulleys and connected at their opposite ends to the front portions of the wings, another pair of cables extending under the second lower pair of guides and attached at their upper ends to the large members of said pulleys and connected at their opposite ends to said wings, a guide movable with the compensating pulleys and a cable extending over said guide and attached at its lower ends to the first-named pair of cables.

28. In an aeroplane, a fuselage, a wing projecting laterally at each side of and from the fuselage, and pivoted for vertical movement, and capable of flexing along its rear margin, a pair of guides above the center of the fuselage, a pair of guides below the center of the fuselage and a greater distance below the plane of the wings than the first-named guides, a cable extending over one of the upper guides and under one of the lower guides and connected at its ends to the rear portions of different wings, a similar cable extending over the other upper guide and the other lower guide and connected at its ends to the rear portions of different wings, a second pair of upper guides, a second pair of lower guides, a pair of compensating pulleys between said second pairs of guides, each pulley comprising a small member and a large member, a pair of cables, extending over the second pair of upper guides and attached at their lower ends to the small members of the pulleys and connected at their opposite ends to the front portions of the wings, another pair of cables extending under the second lower pair of guides and attached at their upper ends to the large members of said pulleys and connected at their opposite ends to said wings, a cylinder, a piston in the cylinder, a stem for the piston carrying said equalizing pulleys and the last-mentioned guide, and means for admitting fluid under pressure to the cylinder to move the piston in one direction or for permitting fluid to escape from the cylinder to permit the piston to be moved in the opposite direction.

29. In an aeroplane, a fuselage, a wing projecting laterally at each side of and hingedly connected to the fuselage for swinging movement in a vertical plane, cables suitably guided at points above the plane of the wings and each extending downwardly and outwardly from one of said points above and connected at its outer end to one of said wings, a second pair of cables suitably guided at points a greater distance below the plane of the wings than the first-named set of guiding points are disposed above such plane and extending upwardly and outwardly from their guiding points under and connected at their outer ends to said wings, vertically movable means between said first-named and last-named sets of guiding points, and means for shortening the first-named cables and lengthening the last-named cables when the said device moves downward and for lengthening the first-named cables and shortening the last-named cables when said device moves upwardly.

30. In an aeroplane, a fuselage, a wing projecting laterally at each side of and hingedly connected to the fuselage for swinging movement in a vertical plane, cables suitably guided at points above the plane of the wings and each extending downwardly and outwardly from one of said points above and connected at its outer end to one of said wings, a second pair of cables suitably guided at points a greater distance below the plane of the wings than the first-named set of guiding points are disposed above such plane, and extending upwardly and outwardly from their guiding points under and connected at their outer ends to said wings, vertically movable means between said first-named and last-named sets of guiding points, means for shortening the first-named cables and lengthening the last-named cables when the said device moves downward and for lengthening the first-named cables and shortening the last-named cables when said device moves upwardly, a cylinder containing air under pressure, a piston in the cylinder carrying said vertically movable device, means for supplying fluid under pressure to the cylinder to force the piston upward and means for exhausting fluid from the cylinder to permit the wings to swing downward.

31. In an aeroplane, a fuselage, a wing projecting laterally at each side of and hingedly connected to the fuselage for swinging movement in a vertical plane, and two sets of compensating pulleys, each consisting of two members of different diameter, cables suitably guided at points above said pulleys and above the plane of the wings and extending downwardly and outwardly above and connected to the wings and each attached at its opposite end to one of the small members of the compensating pulleys, a second pair of cables suitably guided below said compensating pulleys and a greater distance below the plane of the wings than the first-named guiding points are disposed above such plane, and extending upwardly and outwardly from their guided points under and connected to said wings, and attached at their opposite ends to the larger members of said compensating pulleys and engaging the same at the same side of their axes as the first-named cables engage the small members of said compensating pulleys.

32. In an aeroplane, a fuselage, a wing projecting laterally at each side of and hingedly connected to the fuselage for swinging movement in a vertical plane, two sets of compensating pulleys, each consisting of two members of different diameter, cables suitably guided at points above said pulleys and above the plane of the wings and extending downwardly and outwardly above and connected to the wings and each attached at its opposite end to one of the small members of the compensating pulleys, a second pair of cables suitably guided below said compensating pulleys and a greater distance below the plane of the wings than the first-named set of guiding pulleys are disposed above such plane, and extending upwardly and outwardly from their guided points under and connected to said wings and attached at their opposite ends to the larger members of said compensating pulleys and engaging the same at the same side of their axes as the first-named cables engage the small members of said compensating pulleys, means holding the compensating pulleys at a predetermined height, and through the said second set of cables holding the wings against accidental upward movement, and means to release said compensating pulleys during flight to permit the wings to swing upward and impart downward movement to the compensating pulleys and incidentally rotate the same to "pay out" the second set of cables from the larger members and "take up" the other set of cables by winding them upon the smaller members of compensating pulleys.

33. In an aeroplane, a fuselage, a wing projecting laterally at each side of and hingedly connected to the fuselage for swinging movement in a vertical plane, two sets of compensating pulleys, each consisting of two members of different diameter, cables suitably guided at points above said pulleys and above the plane of the wings and extending downwardly and outwardly above the same, a lever attached midway its length to the outer end of the downwardly and outwardly extending portion of each of said cables, a pair of cables attached at their inner ends to the opposite ends of each lever and at their outer ends to the wings at different distances from the hinge points thereof, the opposite ends of said first-named cables being attached to the small members of the compensating pulleys, another pair of cables suitably guided at points below the compensating pulleys and extending upwardly and outwardly from said guide points and attached to the larger members of the compensating pulleys and engaging the same at the same side of their axes as the first-named set of cables engage the small members of said pulleys, levers attached midway their length to the outer ends of the cables guided at points below the compensating pulleys, and a pair of cables attached at their inner ends to the opposite ends of each of said last-named levers and at their outer ends to the wings at different distances from the hinge points thereof.

34. In an aeroplane, a fuselage, a wing projecting laterally from and at opposite sides of the fuselage, collapsible tips for said wings, a suitably guided cable connected to said tips and looped at a suitable point, yielding means connected to the looped portion of the cable and normally holding the tips expanded, and means for collapsing either of the said tips in opposition to said yielding means.

35. In an aeroplane, a fuselage, a wing projecting laterally from opposite sides of said fuselage, a collapsible tip at the outer end of each of said wings, means acting to hold said tips normally yieldingly expanded, suitably guided cables operatively connected at their outer ends to said tips for collapsing the same, the inner ends of said cables being looped and fixed to the fuselage, and a laterally movable control column mounted on the fuselage and provided with sheaves operating within the loops of said cables.

36. The combination in an aeroplane having wings, and a horizontal rudder, a wedge clamp, a control column pivoted above the wedge clamp and adapted when swung rearwardly at its upper end to enter the clamp and force the sides thereof apart, means whereby said wedge clamp when its sides are forced apart, shall warp the rear portions of the wings downward and crossed connections overlying and underlying and connected at their rear ends to said rudder and respectively attached at their front ends to the control column below and above the pivotal point thereof.

In testimony whereof I affix my signature, in the presence of two witnesses.

JOHN WATTS.

Witnesses:
  M. K. PRESTON,
  G. Y. THORPE.